US011772193B2

United States Patent
Shi et al.

(10) Patent No.: US 11,772,193 B2
(45) Date of Patent: Oct. 3, 2023

(54) ANNULAR HOLLOW OFFSET-FOCUS LASER CLADDING DEVICE

(71) Applicant: SOOCHOW UNIVERSITY, Suzhou (CN)

(72) Inventors: Tuo Shi, Suzhou (CN); Rongwei Zhang, Suzhou (CN); Geyan Fu, Suzhou (CN); Shihong Shi, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 44 days.

(21) Appl. No.: 17/674,417

(22) Filed: Feb. 17, 2022

(65) Prior Publication Data

US 2022/0362885 A1 Nov. 17, 2022

(30) Foreign Application Priority Data

May 11, 2021 (CN) .......................... 202110511509.2

(51) Int. Cl.
*B23K 26/34* (2014.01)
*B23K 26/144* (2014.01)
(Continued)

(52) U.S. Cl.
CPC .............. *B23K 26/34* (2013.01); *B22F 12/41* (2021.01); *B22F 12/53* (2021.01); *B22F 12/70* (2021.01);
(Continued)

(58) Field of Classification Search
CPC .... B23K 26/34; B23K 26/144; B23K 26/342; B23K 26/0643; B23K 26/1476;
(Continued)

(56) References Cited

U.S. PATENT DOCUMENTS

| 4,828,357 A | * | 5/1989 | Arata | ................... B23K 26/035 |
| | | | | 219/121.76 |
| 6,934,014 B1 | * | 8/2005 | Kleinhuber | ............ G02B 27/14 |
| | | | | 250/201.3 |

(Continued)

FOREIGN PATENT DOCUMENTS

| CN | 101733550 A | 6/2010 |
| CN | 106312304 A | * 9/2018 ......... B23K 26/0643 |

(Continued)

OTHER PUBLICATIONS

English translation of CN-106312304-A (Year: 2017).*

*Primary Examiner* — Chris Q Liu (57) ABSTRACT

An annular hollow offset-focus laser cladding device, including a housing, a conical reflector arranged in the housing, an annular off-axis parabolic focusing mirror opposite to and arranged coaxially with the conical reflector, a nozzle installed below the conical reflector and a powder-spraying tube connected to a lower end of the nozzle. A top of the housing is provided with a light entrance; the conical reflector faces the light entrance; The powder-spraying tube is coaxial with the annular hollow offset-focusing light reflected by the annular off-axis parabolic focusing mirror; a collimating protective gas jacket is arranged on a periphery of the powder-spraying tube, and the collimating protective gas jacket is located between the annular hollow offset-focused light and the powder-spraying tube; the annular off-axis parabolic focusing mirror is configured to create a horizontally offset of parent parabola focus.

7 Claims, 5 Drawing Sheets

(51) Int. Cl.
    *B23K 26/06*     (2014.01)
    *B23K 26/073*     (2006.01)
    *B23K 26/14*     (2014.01)
    *B33Y 30/00*     (2015.01)
    *B33Y 40/00*     (2020.01)
    *B22F 12/53*     (2021.01)
    *B22F 12/41*     (2021.01)
    *B22F 12/70*     (2021.01)
    *G02B 17/08*     (2006.01)

(52) U.S. Cl.
    CPC ...... B23K 26/0643 (2013.01); B23K 26/0665 (2013.01); B23K 26/0734 (2013.01); B23K 26/144 (2015.10); B23K 26/1476 (2013.01); B33Y 30/00 (2014.12); B33Y 40/00 (2014.12); G02B 17/0868 (2013.01)

(58) Field of Classification Search
    CPC ................ B23K 2103/50; B23K 26/32; B23K 26/0608; B23K 26/067; B23K 26/0734; B23K 26/14; B23K 35/0261; B23K 26/032; B23K 26/1462; B23K 26/702; B23K 26/703; B23K 35/0244; B23K 26/0604; B23K 26/064; B23K 26/0665; B23K 26/0676; B23K 26/0738; B23K 26/082; B23K 26/142; B23K 26/1464; B23K 26/1482; B23K 26/1488; B23K 26/16; B23K 26/704; B23K 35/0227; B23K 2101/006; B23K 2103/30; B23K 26/06; B23K 26/0617; B23K 26/0648; B23K 26/0652; B23K 26/0732; B23K 26/0736; B23K 26/0823; B23K 26/0853; B23K 26/0876; B23K 26/123; B23K 26/146; B23K 26/21; B23K 26/324; B23K 26/60; B23K 35/0255; B23K 35/228
    USPC ............. 219/121.64, 121.6, 121.63, 121.65, 219/121.66, 121.74, 76.14
    See application file for complete search history.

(56) References Cited

U.S. PATENT DOCUMENTS

| | | | |
|---|---|---|---|
| 2003/0075529 A1* | 4/2003 | Mazumder | B23K 26/06 219/121.74 |
| 2003/0116542 A1* | 6/2003 | McGregor | B23K 26/0608 219/121.64 |
| 2015/0202713 A1 | 7/2015 | Yanaka | |
| 2019/0151990 A1* | 5/2019 | Mezawa | B23K 26/0876 |

FOREIGN PATENT DOCUMENTS

| | | |
|---|---|---|
| CN | 113235084 A | 8/2021 |
| CN | 214768946 U | 11/2021 |

* cited by examiner

ANNULAR HOLLOW OFFSET-FOCUS LASER CLADDING DEVICE

CROSS-REFERENCE TO RELATED APPLICATIONS

The present application claims foreign priority of Chinese Patent Application No. 202110511509.2, filed on May 11, 2021 in the China National Intellectual Property Administration, the disclosures of all of which are hereby incorporated by reference.

TECHNICAL FIELD

The disclosure relates to an annular hollow offset-focus laser cladding device, which relates to the technical field of laser processing.

BACKGROUND

Laser cladding technology is an advanced manufacturing technology combining laser technology and additive manufacturing technology, which has developed rapidly i78n recent years. As an advanced processing and forming technology, it has been widely used in metal 3D printing, surface modification of materials and repair of failed parts, etc., which solves many problems in engineering practice and creates huge economic benefits in engineering applications. Laser cladding equipment mainly includes a laser, a cladding nozzle, a processing platform and a feeding device. The laser cladding nozzle is the critical core component of the laser cladding system, which can realize transmission, transformation, focusing of the laser beam and the simultaneous delivery of the cladding material. It can realize the accurate coupling between the laser beam, cladding materials and molten pool on the substrate surface and continuously form the cladding layer. The key technologies of the cladding nozzle, including the shaping and focusing of the laser beam, the transmission and converging of the cladding material, the coupling mode of laser beam. At present, the powder feeding structure of laser cladding nozzle can be divided into two kinds as following:

The first one relates to a coaxial inclined powder feeding method using a solid light spot surrounded by multiple powder-spraying tubes (outside-beam powder feeding). In the prior arts, a special laser cladding nozzle is designed to complete the synchronous powder feeding laser cladding of metal materials. The related method and structure were described in European patent application No. WO2005028151 and Japanese patent application No. JP2005219060, etc. The basic principle is that: the beam is centered and surrounded by metal powder; and the cylindrical laser beam emitted by the laser is focused into a solid conical laser beam, the processing surface is placed near the focus; a plurality of powder spraying nozzles or annular powder feeding nozzles inclined to the beam axis are arranged on the periphery of the solid conical laser beam, and the converging point of the plurality of powder beams ejected from the plurality of nozzles is just located near the focal point. Both the focused spot and the powder beam make a two-dimensional or three-dimensional scanning motion relative to the workpiece, and the metal powder is continuously fed to the focused spot in real time to achieve cladding and solidification and form a molten channel and is gradually accumulated and formed.

The other relates to a center vertical powder feeding method using an annular hollow light spot surrounding a single powder-spraying tube (inside-beam powder feeding). The inside-beam coaxial powder feeding nozzle adopts a coupling mode of light and powder named "light surrounding powder". The solid beam is converted into a ring-cone beam or multi-beam; the powder feeding tube is placed vertically in the hollow and non-light area to realize that the powder feeding tube is centered, and the powder is fed inside the laser beam.

A CN patent application No. 201020022781.1 discloses a device coaxially feeding light, powder, and gas for laser cladding forming, which includes a powder feeding nozzle cylinder with a light inlet on an upper side and a light outlet on a lower side. A conical reflector facing the light entrance is provided in the cylinder body, and an annular reflective focusing mirror is arranged coaxially with the conical reflector. A powder feeding tube is fixed under the conical reflector. A nozzle is connected to the lower end of the powder feeding tube, and the nozzle is coaxial with the input laser beam; the nozzle is characterized in that a collimating protective gas jacket is provided on the periphery of the nozzle between the conical reflector and the outlet of the nozzle. The application realizes the coaxial transmission of light, powder and gas by arranging a collimating protective gas jacket on the periphery of the nozzle, and solves the shortcomings in the use of protective gas in the prior art.

A CN patent application No. 201811548923.5 discloses an omnidirectional laser cladding device in three-dimensional space, including a support frame and a cladding nozzle located above the support frame; the support frame is provided with a beam splitter and a focusing mirror; the beam splitter receives the incident light beam and reflects the incident light beam to form a reflected beam. The focusing mirror receives the reflected beam and converts the reflected beam into a focused beam. The support frame is provided with a beam channel for passing the focused beam. The cladding nozzle includes a nozzle body and a nozzle opening formed on the end of the nozzle body; the nozzle body is provided with a cladding channel for the cladding material to pass through; the cladding channel communicates with the nozzle opening to feed the cladding material through the nozzle opening. The laser cladding device further includes a protective gas curtain component arranged between the nozzle opening and the support frame and configured to form a protective gas curtain above the support frame and blow/isolate the cladding material located above the beam channel through the protective air curtain. When the laser cladding device is tilted at a large angle and erected upward or the orientation is continuously changed in space, the splashed and dropped cladding material will not damage the focusing mirror, and the omnidirectional cladding in the three-dimensional space is realized.

Figure 1:
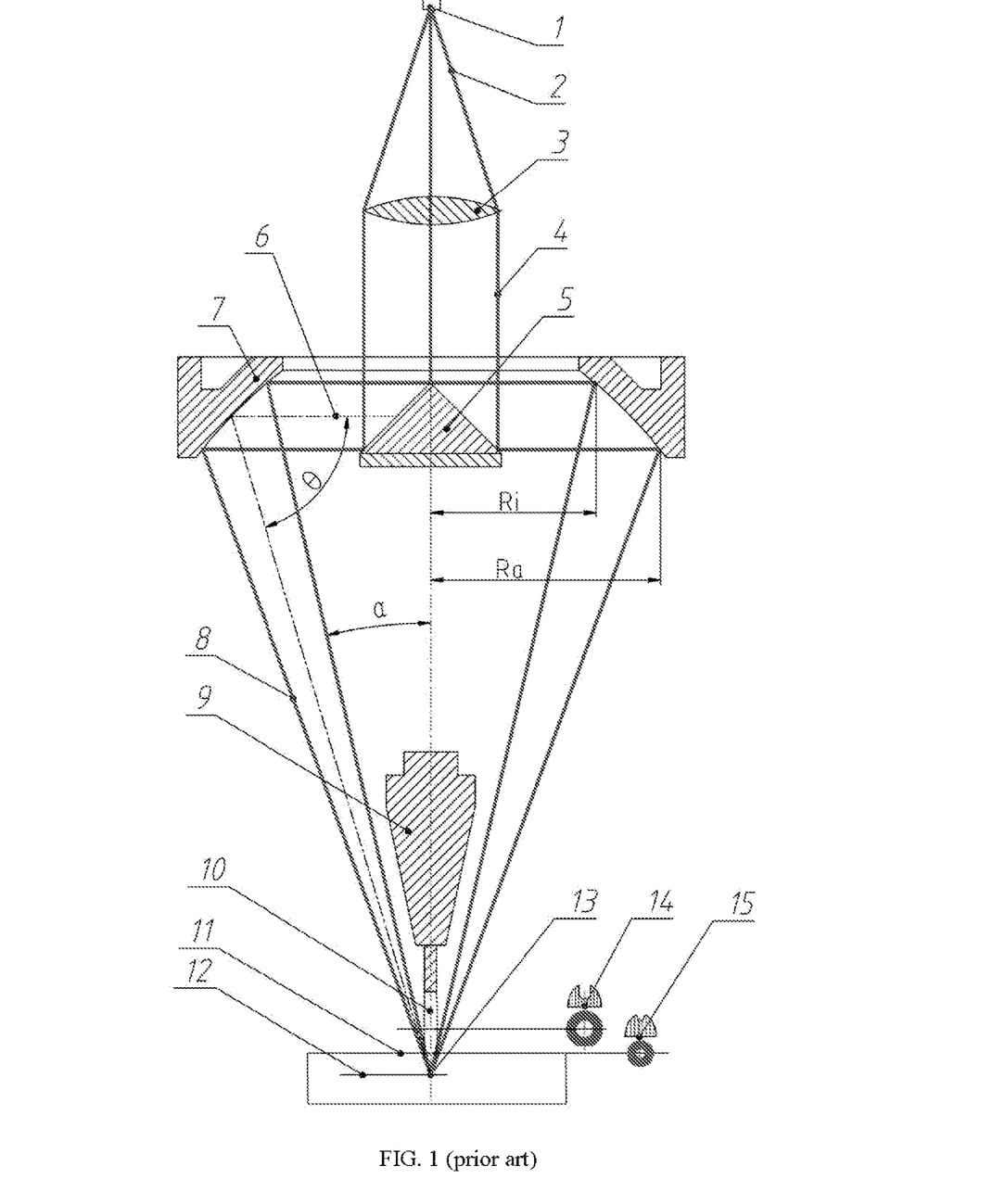
FIG. 1 is a schematic diagram of an inside-beam coaxial powder feeding device in the prior art.

A CN patent application No. 201621159526.5 discloses a focusing device for inside-beam coaxial powder feeding. As shown in FIG. 1, a rear part of a laser beam exit port is sequentially provided with a collimating mirror 3, a conical reflector 5, and an annular off-axis parabolic focusing mirror 7. The conical reflector and the annular off-axis parabolic focusing mirror both have rotationally symmetrical structures around the central axis. The reflective surfaces are arranged oppositely; a defocus laser beam 2 with a certain angle emitted by the laser is collimated by the collimating mirror 3 into a parallel cylindrical collimated beam 4. The cylindrical collimated beam 4 is reflected by the conical mirror 5 to the annular off-axis parabolic focusing mirror 7; the reflected cylindrical collimated beam 4 is divided into a ring-cone focused beam 8, which is finally focused on the working plane 11. A dot light spot is formed on the focal position. In general work, the working plane 11 should be at an upper or lower defocusing position of the focal point 13 according to the needs, so that the cross section of the ring-cone focused beam 8 forms a hollow annular spot with a certain size. The hollow annular spot is used to form a molten pool of the required size and melt the powder material ejected from the nozzle 9; the hollow annular spot makes the center peak energy of original solid spot move outward and strengthens the outer energy of the spot.

As shown in FIG. 1, the above-mentioned existing focusing devices can obtain an annular spot of the required size to form an annular high-temperature molten pool, thereby melting the metal powder beam 10 sprayed into the molten pool by the nozzle 9 when performing conventional cladding under the state of focus laser path and negative defocus laser spot; can also uniformize the light energy distribution on the scanning line, and form molten channels with different widths by continuous scanning movement and continuously cladding and solidifying. However, in order to efficiently form a wide cladding channel with a large defocus, the duty ratio of the annular spot on the section is too large, resulting in insufficient light energy in the middle of the molten pool, insufficient cladding layer in morphology, and even defects. Therefore, it is necessary to propose further solutions to the above-mentioned problems.

Figure 2:
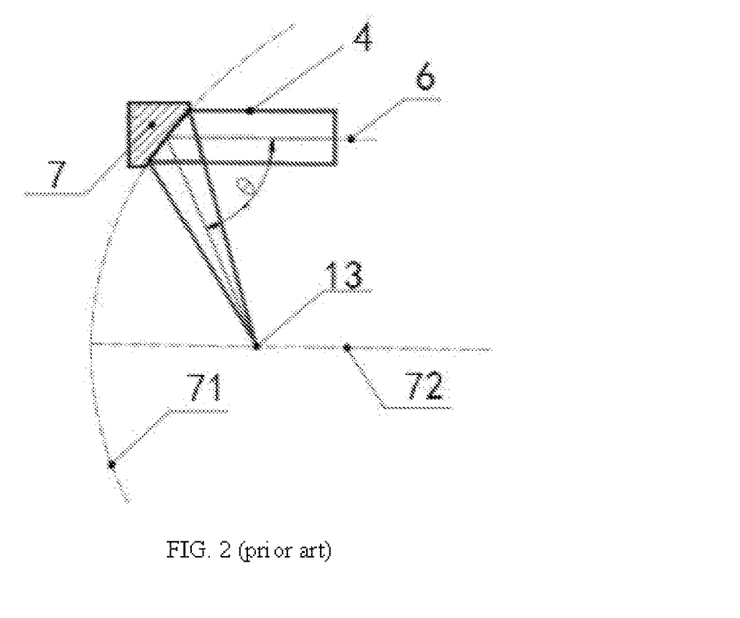
FIG. 2 is a schematic diagram of an annular off-axis parabolic focusing mirror in the prior art.

Compared with the traditional laser cladding method of outside-beam powder feeding, the laser cladding method of inside-beam powder feeding has the following characteristics: the divergent laser is converted into parallel light by the collimating mirror system, and the incident parallel light is dispersed into a uniform ring light by the beam splitter and irradiates on the ring focusing mirror (the principle is shown in FIG. 2; the section of the annular off-axis parabolic focusing mirror can be regarded as a section of the parent parabola; they have the same focus, but the optical axis of the annular off-axis parabolic focusing mirror is parallel to and deviated from the optical axis of the parent parabolic. The beam generated by the focusing of the reflector produces an off-axis angle with the original incident optical axis; the off-axis angle depends on the selection of the parent parabola section and the width of the parent parabola; and a section farther away from the parabolic axis will produce a larger off-axis angle, resulting in a larger focal length), to converge into a hollow annular beam path. The hollow annular light path has a large internal space, which can accommodate a complete set of circulating systems such as powder, gas and cooling water, etc., which not only reduces the volume of the entire cladding nozzle, but also achieve an installation of collimating protective gas tube outside the powder-spraying tube located in the center axis of the nozzle. The powder-spraying tube and the collimating protective gas tube together form a cladding nozzle. Under the combined action of gravity and powder-carrying gas, a small divergence of the powder beam and better coaxial combination of light, powder and gas are realized.

However, the laser cladding method of inside-beam powder feeding currently has the following problems:

The powder will be irradiated by the laser beam before it reaches the substrate. Because the spot energy in different areas of the hollow circular light path is different, when the powder passes through the laser beam and falls on the surface of the substrate, the powder will have several different states:

1) The powder particles are heated enough and completely melted to form droplets.
2) The powder particles are partially melted when inadequately heated, and the unmelted powder particles absorb heat during the mixing process with the melted liquid and are finally melted.
3) The powder particles are seriously inadequately heated and are still solid particles since they are not melted.

Under normal circumstances, powder particles that are melted in liquid form will stick to the surface of the substrate when they are dropped on the surface of the substrate; and powder particles that are not sufficiently heated will bounce off when hitting the surface of the substrate, resulting in sparks splashing; and the insufficiently heated particles enter the molten pool and continue to melt. The state of the powder particles when they reach the surface of the substrate has a great influence on the quality of the final parts formed by cladding.

At the same time, the conventional laser cladding rate is low, generally 0.5~3 m/min, the powder utilization rate is low, generally about 60%, and the cladding layer has a large roughness, resulting in serious material waste; and the laser energy is focused on the substrate material, the powder is mixed and combined by melting the substrate material, which makes the laser energy utilization efficiency and cladding rate low; and the energy absorbed by the center of the powder is not enough under the large defocus amount, the powder is still solid particles when combined with the substrate material, and the surface smoothness of the finished product is poor. In order to improve the cladding efficiency, the laser power and the spot area are increased, but the deformation of the workpiece is also increased, it is necessary to reserve a larger machining allowance.

When using a focus laser cladding nozzle for inside-beam powder feeding and trying to perform wide-spot cladding with a large defocus, the duty ratio of the annular spot on the working plane becomes larger, resulting in insufficient light energy in the middle of the molten pool; the high-density powder sprayed from the powder-spraying tube on the central axis falls into the hollow area of the light spot and cannot be fully melted. As a result, insufficient melting, powder sticking, pores, etc. are more likely generated, which cause adhesion defects between the cladding layer and the substrate and failure of cladding accumulation since the cladding layer is not full. In other words, the focus annular hollow laser cannot achieve the high efficiency of cladding with wide cladding channel by changing the defocus amount.

Therefore, it is urgent to provide a new annular hollow laser cladding device with a low duty ratio to solve the above-mentioned problems in the prior arts.

SUMMARY

The purpose of the present disclosure is to provide an annular hollow offset-focus laser cladding device to solve the above-mentioned problems in the prior arts. The horizontal position of the annular focusing parabolic mirror is changed, that is, the defocus amount of the parent parabolic focus is changed, to achieve the uniformity of the energy density of the annular spot, improve the coupling effect of the laser beam and the powder, increase the utilization rate of the metal powder, and improve the quality and morphology of the cladding.

To achieve the above objectives, the present disclosure provides the following solutions. An annular hollow offset-focus laser cladding device, comprising a housing, a conical reflector, an annular off-axis parabolic focusing mirror, a nozzle and a powder-spraying tube; wherein a top of the housing is provided with a light entrance; the conical reflector is arranged in the housing, and the conical reflector faces the light entrance; the annular off-axis parabolic focusing mirror and the conical reflector are opposite to each other and arranged coaxially; the nozzle is installed below the conical reflector, and a lower end of the nozzle is connected with the powder-spraying tube; the powder-spraying tube is coaxial with an annular hollow offset-focused light formed after being reflected by the annular off-axis parabolic focusing mirror; a collimating protective gas jacket is arranged on a periphery of the powder-spraying tube, and the collimating protective gas jacket is located between the annular hollow offset-focused light and the powder-spraying tube; the annular off-axis parabolic focusing mirror is configured to create a horizontally offset of parent parabola focus.

Preferably, the annular off-axis parabolic focusing mirror is machined by reducing a horizontal depth of cut of cutting tool.

Preferably, an upper cover is provided on the top of the housing, and the light entrance is formed on the upper cover.

Preferably, the annular off-axis parabolic focusing mirror and the conical reflector are coaxially arranged on a composite mirror holder, and a nozzle adjusting seat is fixedly arranged at a bottom of the composite mirror holder, the nozzle adjusting seat is located below the conical reflector, and the nozzle is installed on the nozzle adjusting seat; the nozzle is connected with a powder sprayer for providing powder.

Preferably, a protective lens is provided at the bottom of the composite mirror holder.

Preferably, the collimating protective gas jacket is provided with gas outlet holes along a circumferential direction, and the collimating protective gas jacket is provided with a collimating protective gas jacket nozzle.

Preferably, the nozzle comprises a nozzle adjusting shaft, a depressurizing chamber and a powder tube spring clip; a depressurizing chamber baffle ring is provided on the depressurizing chamber; a spring clip locking nut is arranged on the powder tube spring clip; the collimating protective gas jacket is connected to the depressurizing chamber, and the powder-spraying tube penetrates the powder tube spring clip and the spring clip locking nut, and is coaxially butted with the depressurizing chamber.

Preferably, the depressurizing chamber is further provided with a depressurizing chamber connection pipe configured to communicate with an outside atmosphere.

Preferably, a protective gas hood is connected to a bottom of the housing, the protective gas hood is located outside the nozzle, and the annular hollow offset-focused light is located between the protective gas hood and the nozzle.

Compared with the prior art, the present disclosure has achieved the following beneficial technical effects:

When using a focus laser cladding nozzle for inside-beam powder feeding and trying to perform wide-spot cladding with a large defocus, laser energy density per unit area is low and the duty ratio of the annular spot on the working plane becomes larger, resulting in insufficient light energy in the middle of the molten pool; the high-density powder sprayed from the powder-spraying tube on the central axis cannot be fully melted. As a result, powder sticking, pores, etc. are more likely generated, which cause adhesion defects between the cladding layer and the substrate and failure of cladding accumulation since the cladding layer is not full. In other words, the focus annular hollow laser cannot achieve the high efficiency of cladding with wide cladding channel by changing the defocus amount.

By changing the horizontal position of the annular off-axis parabolic focusing mirror, that is, the horizontal position of the parent parabolic focus is changed. Further, the annular focused beams are overlapped toward the center and the beam is offset-focused, and after overlapping, the beams are dispersed to form a focus ring. The annular or solid working spot with a larger diameter but a smaller duty ratio is formed on the working plane with a negative defocus. As the duty ratio of the spot near the positive and negative defocus position of the laser focus is reduced, the diameter of the solid spot at the laser focus is enlarged, thereby improving upper limit value of weld width. The light energy distribution on the working spot can be adjusted according to the working conditions, so as to realize the uniformity of the energy density of the annular spot, increase the coupling area of the laser beam and the powder, increase the utilization rate of the metal powder, and improve the quality and morphology of the cladding. In addition, by changing the defocus amount of the working plane, a continuous change from a large-size hollow annular beam to a large-size solid beam can be realized.

When the laser cladding head is working in the positive defocus range, the powder will first pass through the convergent focal point after being ejected from the powder-spraying tube, and achieve the purpose of preheating by shielding a part of the laser beam, such that the powder reaching the substrate can be fully melted, which reduces the residual stress caused by temperature difference and phase change during the cladding forming process, and avoids defects such as pores and cracks in the cladding layer, realizes that the powder particles are fully heated and melted into droplets before reaching the substrate, reduces the rebound of unmelted powder in the substrate, improves powder utilization and cladding efficiency.

When the laser cladding head is working in the negative defocus range, because the annular hollow offset-focused laser can reduce the duty ratio of the spot near the negative defocus position of the laser focus, the diameter of the solid focus spot at the laser focus is enlarged, that is, the largest solid spot exists. The diameter of the powder beam that can be radiated and heated is enlarged, and the upper limit value of weld width is increased. Due to the characteristics of the offset-focused beam of inside-beam powder feeding, the highest laser energy density is no longer located on a small focus but a focused spot with a uniform energy density, making the cladding layer smoother and fuller.

The size of the working spot can be adjusted according to the required power and power density. The diameter of the adjusted spot is increased, the annular spot or solid spot with a small duty ratio is ensured, and the area of the hollow area relative to the light spot is reduced. In summary, the present disclosure provides a new technical device that can simultaneously perform high-speed preheating cladding under positive defocus and wide-spot cladding under extremely negative defocus.

BRIEF DESCRIPTION OF THE DRAWINGS

To describe the technical solutions in the embodiments of the present disclosure or the prior art more clearly, the drawings will be briefly described below. Obviously, the drawings described below are only some of the embodiments of the present disclosure. For those of ordinary skill in the art, other drawings can be obtained based on these drawings without creative work.

In the figures, 1—fiber exit; 2—divergent laser beam; 3—collimating mirror; 4—collimated beam; 5—conical reflector; 6—optical axis centerline; 7—annular off-axis parabolic focusing mirror; 71—parent paraboloid; 72—parabolic optical axis; 8—ring-cone focused beam; 9—nozzle; 10—powder beam; 11—working plane; 12—focus plane; 13—focus point; 14—annular light energy distribution under large defocus amount; 15—annular light energy distribution under small defocus amount; 16—upper cover; 17—composite mirror holder; 18—housing; 19—protective lens; 20—nozzle adjusting seat; 21—nozzle adjusting shaft; 22—depressurizing chamber; 23—depressurizing chamber baffle ring; 24—collimating protective gas jacket; 25—powder tube spring clip; 26—spring clip locking nut; 27—powder-spraying tube; 28—protective gas hood; 29—light entrance; 101—unheated powder; 102—heated powder; 103—molten pool; 104—spot position of wide-spot with small duty ratio; 105—spot position of largest solid spot; 106—spot position of smallest solid spot; 107—original paraboloid; 108—present paraboloid; 109—focusing plane; 110—focusing ring; 111—light energy distribution of the largest solid spot; 112—light energy distribution of the smallest solid spot; 113—light energy distribution of positive defocusing light spot; 114—light energy distribution of negative defocusing light spot; 115—central axis of parabola before defocusing; 116—central axis of the parabola after defocusing; 117—parent parabola before defocusing; 118—parent parabola after defocusing; 119—original focused beam; 120—defocused beam.

DETAILED DESCRIPTION OF PREFERRED EMBODIMENTS

The technical solutions in the embodiments of the present disclosure will be clearly and completely described below in conjunction with the accompanying drawings. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

The purpose of the present disclosure is to provide an annular hollow offset-focus laser cladding device to solve the above-mentioned problems in the prior art. The horizontal dimension of the annular focusing parabolic mirror is changed, that is the defocus amount of the parent parabolic focus is changed, to achieve the uniformity of the energy density of the annular spot, improve the coupling effect of the laser beam and the powder, increase the utilization rate of the metal powder, and improve the quality and morphology of the cladding.

To make the above objectives, features and advantages of the present disclosure more obvious and understandable, the present disclosure will be further described in detail below in conjunction with the accompanying drawings and specific embodiments.

Embodiment One

As shown in FIGS. 3-6, the present embodiment provides an annular hollow offset-focus laser cladding device, including an upper cover 16, a housing 18, a composite mirror holder 17, a conical reflector 5, and an annular off-axis parabolic focusing mirror 7, protective lens 19, air-blow base, protective gas hood 28. An upper part of the housing 18 is provided with a light entrance 29, and the conical reflector 5 (conical plan-reflector can be used) is arranged in the housing 18 and faces the light entrance 29, and the annular off-axis parabolic focusing mirror 7 and the conical reflector 5 are opposite to each other and arranged coaxially. The composite mirror holder 17 is installed in the housing 18. A periphery of the composite mirror holder 17 is provided with a mounting part of the annular off-axis parabolic focusing mirror 7, and a middle part of the composite mirror holder 17 is provided with a mounting part of the conical reflector 5. The two mounting parts can be connected by rib plate. The two mounting parts are arranged in a staggered manner with the annular hollow offset-focused light, and there is a space between the two mounting parts for the annular hollow defocused light to pass through; the annular off-axis parabolic focusing mirror 7 and the conical reflector 5 are coaxially arranged on the composite mirror holder 17.

Figure 5:
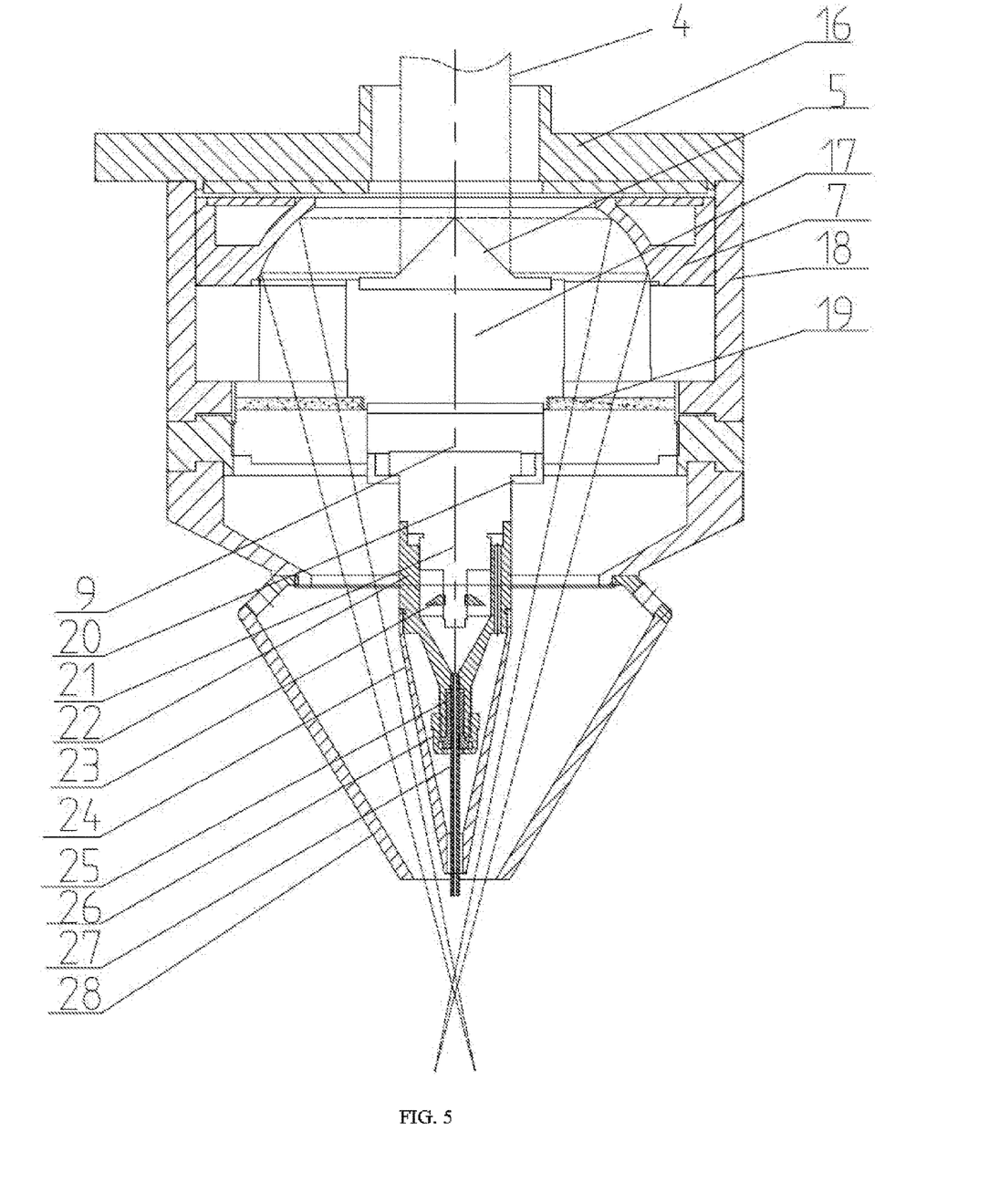
FIG. 5 is a schematic structural diagram of the annular hollow offset-focus laser cladding device according to the present disclosure.

A nozzle adjusting seat 20 is fixedly arranged at a bottom of the mounting part of the conical reflector 5. The nozzle adjusting seat 20 is located below the conical reflector 5 for installing a nozzle 9. The nozzle 9 is connected with a powder-spraying tube 27. The powder-spraying tube 27 is coaxial with the annular hollow offset-focused light formed after being reflected by the annular off-axis parabolic focusing mirror 7. A collimating protective gas jacket 24 is arranged on a periphery of the powder-spraying tube 27. The collimating protective gas jacket 24 is located between the annular hollow offset-focused light and the powder-spraying tube 27. A protective lens 19 is also provided at the bottom of the composite mirror holder 17.

When the annular hollow offset-focus laser cladding device of the present embodiment is in use, a circular fundamental mode laser beam emitted by laser enters the chamber of the housing 18 along an axis of the annular hollow offset-focus laser cladding device from the light entrance 29, and is incident on the conical reflector 5 installed in the housing 18, the laser beam reflected by the conical reflector 5 is incident on the annular off-axis parabolic focusing mirror 7 opposite to and installed coaxially with the conical reflector 5, and then forms an annular hollow offset-focused laser. The middle of the annular hollow defocused laser forms an ring-cone hollow no-light zone.

Figure 6:
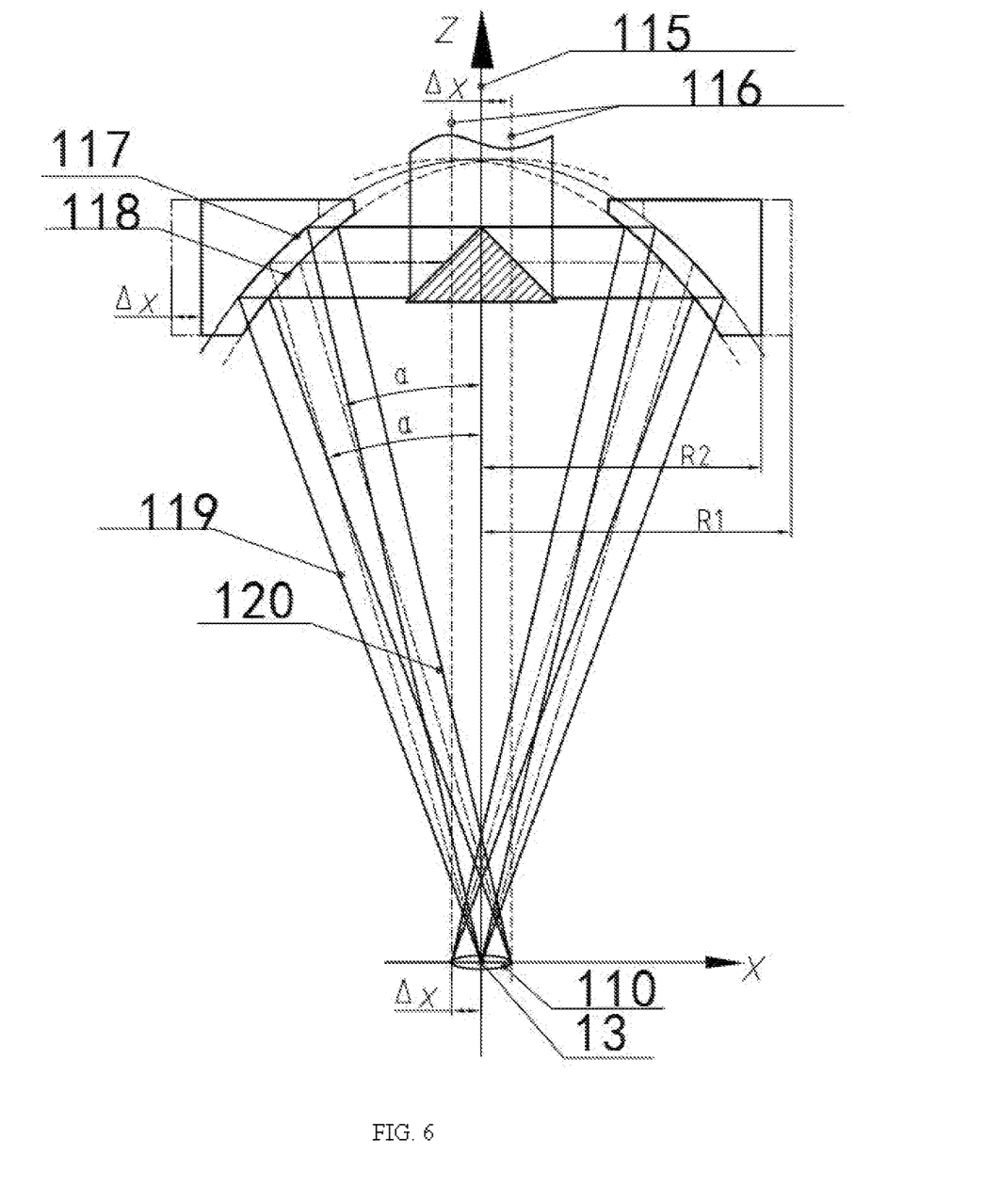
FIG. 6 is a schematic diagram of the annular off-axis parabolic focusing mirror of the present disclosure.

Compared with the annular off-axis parabolic focusing mirror 7 in the prior art, the annular off-axis parabolic focusing mirror 7 in the present embodiment can horizontally shift focus point 13 of the parent parabolic, and finally change the defocus amount of the focused beam and duty ratio of spots in different defocus plane. Specifically, in the present embodiment, when the annular off-axis parabolic focusing mirror 7 is machined, the horizontal cut depth of the turning tool is reduced, thereby changing the horizontal position of reflective surface of the annular off-axis parabolic focusing mirror 7 (that is, the size of the annular through hole in the middle of the annular off-axis parabolic focusing mirror 7 is changed), so that the horizontal offset of the focus point 13 of the parent parabolic is achieved.

As shown in FIG. 6, the original horizontal dimension of the annular off-axis parabolic focusing mirror 7 is R1. The horizontal dimension of the annular off-axis parabolic focusing mirror 7 is reduced. A parabolic focusing mirror is horizontally moved inward by distance of Δx to change the horizontal dimension of annular off-axis parabolic focusing mirror 7 to R2, that is, the center axis of the parabola has a distance offset of Δx. Without changing the off-axis angle α, the focus point 13 is also shifted by Δx in the focus plane 109, such that a hollow focusing ring 110 is formed, and finally a defocused beam 120 with a variable duty ratio under different defocus planes is formed.

In the present embodiment, the nozzle 9 is placed in the ring-cone hollow no-light zone. The nozzle 9 includes a nozzle adjusting shaft 21, a depressurizing chamber 22, a depressurizing chamber baffle ring 23, a powder tube spring clip 25 and a spring clip locking nut 26. The nozzle adjusting shaft 21 is provided in the middle of the nozzle 9, and the nozzle 9 is installed on the nozzle adjusting shaft 21. The nozzle adjusting shaft 21 is coaxially installed at the bottom of the mounting part of the conical reflector 5. A periphery of the nozzle 9 is provided with the depressurizing chamber 22. A powder-spraying tube 27 is installed at the lower end of the nozzle 9 through the powder tube spring clip 25. During operation, the powder provided by the external powder feeder enters the nozzle 9 and then is sprayed to the center of the beam by the powder-spraying tube 27. A collimating protective gas jacket 24 is arranged on the periphery of the powder-spraying tube 27. While the powder-spraying tube 27 is spraying powder, the collimating protective gas jacket 24 sprays collimating protective gas from outlet holes formed in the circumferential direction to form a collimating protective gas curtain. The collimating protective gas moves in one dimension. It is laminar flow or close to laminar flow under appropriate pressure. It can collimate the powder beam 10, so that the beam is hollow, the powder beam 10 can be centered and the collimating protective gas curtain surrounds the periphery of the powder. The collimating protective gas, annular hollow offset-focused laser and the powder beam 10 sprayed by the powder-spraying tube 27 are coaxial.

In the present embodiment, the collimating protective gas jacket 24 is connected to the depressurizing chamber 22, and the powder-spraying tube 27 penetrates the powder tube spring clip 25 and the spring clip locking nut 26 and is coaxially butted with the depressurizing chamber 22. A depressurizing chamber connecting pipe is also provided on the depressurizing chamber 22, and the depressurizing chamber connecting pipe is communicated with the outside atmosphere so that the powder beam 10 can fall by gravity, so as to achieve a better convergence effect and increase the utilization rate of the powder beam 10.

The working principle in the present embodiment is as follows.

Figure 4:
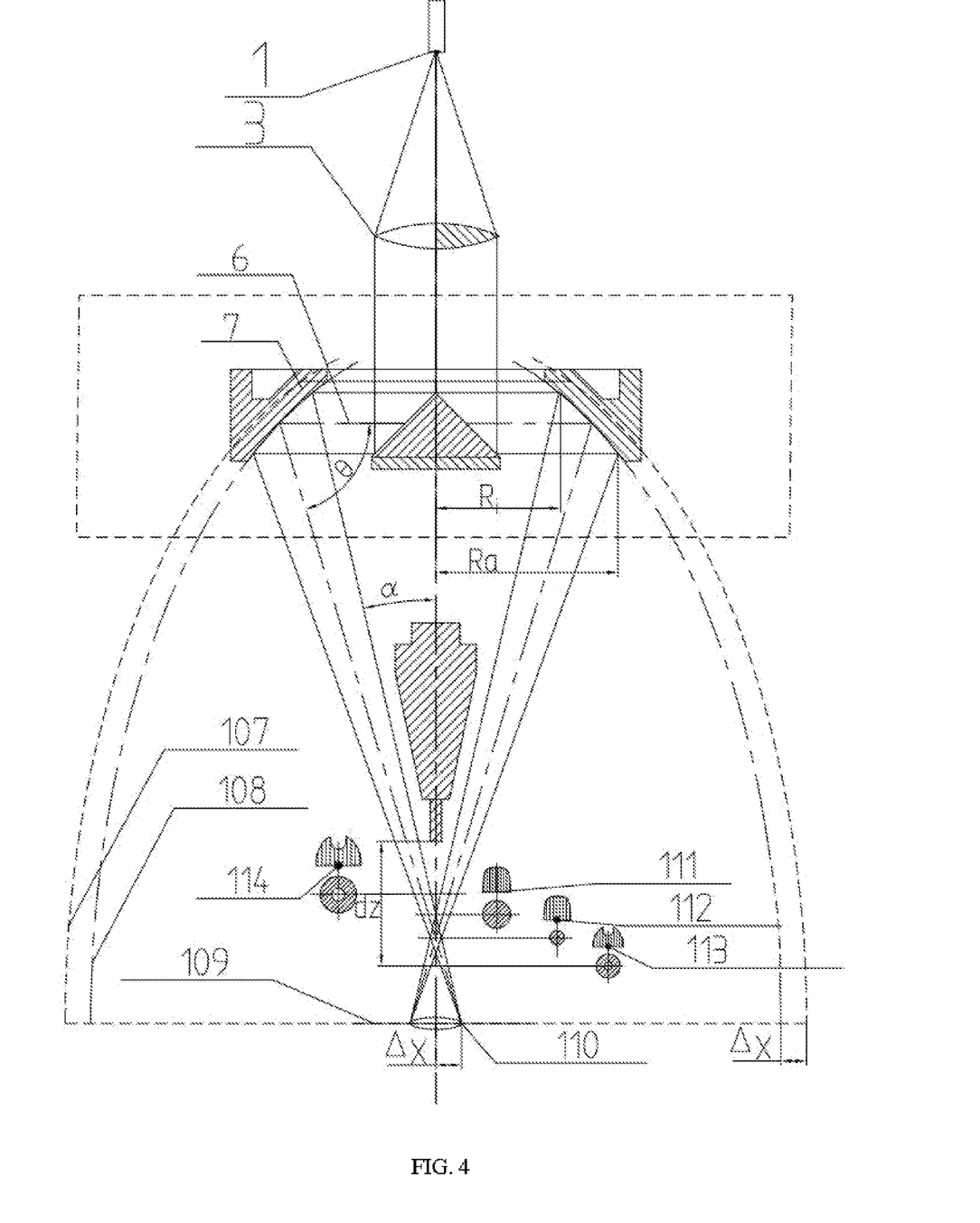
FIG. 4 is a schematic diagram of an annular hollow offset-focus laser of the present disclosure.

The equipment required in the present embodiment is a laser cladding head developed by the Institute of Laser Manufacturing Technology of Soochow University and a KUKA robotic arm. In the traditional laser cladding, when the defocus amount is large, the laser spot has a relatively large duty ratio, and the powder beam 10 may not be melted in the middle, causing defects in the middle of the melt. In order to allow the powder to be heated uniformly in the air under a large defocus amount, the heating time is prolonged to make the powder fully melted. In the present embodiment, a new type of defocus beam path is adopted, as shown in FIG. 4, where the beam path parameters are off-axis angle θ, inner beam path focus half angle α, defocus amount Δx of the parent parabolic focus point, and upper beam path radius Ri, and lower beam path radius Ra.

The off-axis angle θ depends on the cross section of the parent paraboloid 71 and the width of the parent paraboloid 71. A section closer to the parabolic axis will result in a smaller off-axis angle, and a parabolic section closer to the focal point will make the distance between the mirror center and the focal point shorter. The width of the parent paraboloid 71 also affects the focal length, that is, the wider the paraboloid, the longer the focal length. Therefore, in order to control the focal length, it is necessary to reasonably select the position of the cross section and the width of the parent paraboloid 71.

In addition, by changing the horizontal dimension of the annular off-axis parabolic focusing mirror, that is, changing the defocus amount Δx of the parent parabolic focus, the upper beam path radius Ri and the lower beam path radius Ra of the annular off-axis parabolic focusing mirror 7 will be eventually affected, so as to shift the focus 13. Thus, an annular or solid working spot with a larger diameter but a smaller duty ratio is formed on the working plane 11 with a positive defocus. The size of the working spot can be adjusted according to the required power and power density. The diameter of the adjusted spot is increased, and the annular spot or solid spot with a small duty ratio is ensured, as shown in FIG. 3.

In order to solve the problems of "inside-beam powder feeding" nozzle in laser cladding deposition additive manufacturing, the horizontal dimension of the annular off-axis parabolic focusing mirror is changed, that is, the defocus of the parent parabolic focus is changed. The annular or solid working spot with a larger diameter but a smaller duty ratio is formed on the working plane 11 with a positive defocus. As the duty ratio of the spot near the positive and negative defocus position of the laser focus is reduced, the diameter of the solid spot at the laser focus is enlarged, thereby improving upper limit value of weld width. The light energy distribution on the working spot can be adjusted according to the working conditions, so as to realize the uniformity of the energy density of the annular spot, improve the coupling effect of the laser beam and the metal powder, increase the utilization rate of the metal powder, and improve the quality and morphology of the cladding.

In addition, by changing the defocus amount of the working plane 11, a continuous change from a large-size hollow annular light to a large-size solid annular light can be realized.

Figure 3:
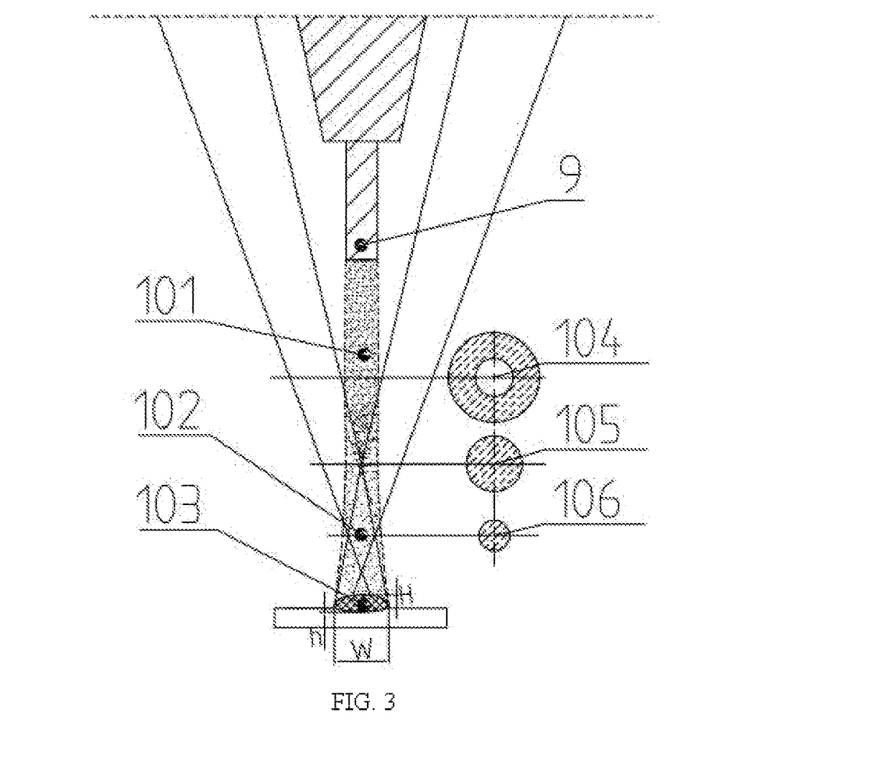
FIG. 3 is a diagram showing the powder heated by the inside-beam offset-focus laser for high-speed cladding according to the present disclosure.

As shown in FIG. 3, when the laser cladding head is working in the positive defocus range, the powder will pass through the focusing point after being ejected from the powder-spraying tube 27, and achieve the purpose of pre-heating by shielding a part of the laser beam, so that the powder reaching the substrate can be fully melted. This cladding method can fully heat the powder particles before they reach the matrix, reduce the rebound of the unmelted powder in the matrix, and improve the powder utilization ratio, the residual stress caused by temperature difference and phase transformation is reduced, and the defects such as pores and cracks are avoided.

When the laser cladding head is working in the negative defocus range, because the annular hollow offset-focused laser can reduce the duty ratio of the spot near the negative defocus of the laser focus, the diameter of the solid focus spot at the laser focus is enlarged, that is, the largest solid spot exists. The diameter of the powder beam 10 that can be radiated and heated is enlarged, and the upper limit value of weld width is increased. Due to the characteristics of the defocused beam 120 of inside-beam powder feeding, the highest laser energy density is no longer located on a small focus but a focused spot with a uniform energy density, making the cladding layer smoother and fuller.

In summary, the present disclosure provides a new technical device that can simultaneously perform high-speed preheating cladding under positive defocus and wide-spot cladding under extremely negative defocus.

It should be noted that for those skilled in the art, it is obvious that the present disclosure is not limited to the details of the above exemplary embodiments, and the present disclosure can be implemented in other specific forms without departing from the spirit or basic characteristics of the present disclosure. Therefore, from any point of view, the embodiments should be regarded as exemplary and non-limiting. The protection scope of the present disclosure is defined by the claims rather than the foregoing descriptions. Therefore, all changes within the meaning and scope of the equivalent elements of the claims are included in the protection scope of the present disclosure, and any reference signs in the claims should not limit the involved claims.

In the present disclosure, specific embodiments are used to illustrate the principles and implementation of the present disclosure. The descriptions of the above embodiments are only used to help understand the method and core idea of the present disclosure; at the same time, for those of ordinary skill in the art, the specific implementation and the scope of application will change based on the idea of the disclosure. In conclusion, the content of this specification should not be construed as a limitation to the present disclosure.

The invention claimed is:

1. An annular hollow offset-focus laser cladding device, comprising
a housing,
a conical reflector,
an annular off-axis parabolic focusing mirror,
a nozzle and
a powder-spraying tube; wherein a top of the housing is provided with a light entrance; the conical reflector is arranged in the housing, and the conical reflector faces the light entrance; the annular off-axis parabolic focusing mirror and the conical reflector are opposite to each other and arranged coaxially; the nozzle is installed below the conical reflector, and a lower end of the nozzle is connected with the powder-spraying tube; the powder-spraying tube is coaxial with an annular hollow offset-focused light formed after being reflected by the annular off-axis parabolic focusing mirror; a collimating protective gas jacket is arranged on a periphery of the powder-spraying tube, and the collimating protective gas jacket is located between the annular hollow offset-focused light and the powder-spraying tube; the annular off-axis parabolic focusing mirror is configured to create a horizontally offset of parent parabola focus;
wherein the nozzle comprises a nozzle adjusting shaft, a depressurizing chamber and a powder tube spring clip; a depressurizing chamber baffle ring is provided on the depressurizing chamber; a spring clip locking nut is arranged on the powder tube spring clip; the collimating protective gas jacket is connected to the depressurizing chamber, and the powder-spraying tube penetrates the powder tube spring clip and the spring clip locking nut, and is coaxially butted with the depressurizing chamber.

2. The annular hollow offset-focus laser cladding device of claim 1, wherein the annular off-axis parabolic focusing mirror is machined by reducing a horizontal depth of cut of cutting tool.

3. The annular hollow offset-focus laser cladding device of claim 1, wherein an upper cover is provided on the top of the housing, and the light entrance is formed on the upper cover.

4. The annular hollow offset-focus laser cladding device of claim 1, wherein the annular off-axis parabolic focusing mirror and the conical reflector are coaxially arranged on a composite mirror holder, and a nozzle adjusting seat is fixedly arranged at a bottom of the composite mirror holder, the nozzle adjusting seat is located below the conical reflector, and the nozzle is installed on the nozzle adjusting seat.

5. The annular hollow offset-focus laser cladding device of claim 4, wherein a protective lens is provided at the bottom of the composite mirror holder.

6. The annular hollow offset-focus laser cladding device of claim 1, wherein the depressurizing chamber is further provided with a depressurizing chamber connection pipe configured to communicate with an outside atmosphere.

7. The annular hollow offset-focus laser cladding device of claim 1, wherein a protective gas hood is connected to a bottom of the housing, the protective gas hood is located outside the nozzle, and the annular hollow defocused light is located between the protective gas hood and the nozzle.

* * * * *